US007634902B2

(12) United States Patent
Zelezny et al.

(10) Patent No.: US 7,634,902 B2
(45) Date of Patent: Dec. 22, 2009

(54) METHOD AND DEVICE FOR CONVERTING HEAT ENERGY INTO MECHANICAL ENERGY

(76) Inventors: Eduard Zelezny, M. Cibulkove 9, 140 00 Praha 4 (CZ); Simona Tolarova, Ve Svahu 31, 140 00 Praha 4 (CZ); Filip Zelezny, M. Cibulkove 9, 140 00 Praha 4 (CZ)

( * ) Notice: Subject to any disclaimer, the term of this patent is extended or adjusted under 35 U.S.C. 154(b) by 103 days.

(21) Appl. No.: 10/551,786

(22) PCT Filed: Mar. 25, 2004

(86) PCT No.: PCT/CZ2004/000015

§ 371 (c)(1), (2), (4) Date: Oct. 3, 2005

(87) PCT Pub. No.: WO2004/088114

PCT Pub. Date: Oct. 14, 2004

(65) Prior Publication Data

US 2006/0196186 A1 Sep. 7, 2006

(30) Foreign Application Priority Data

Apr. 1, 2003 (CZ) .................................. 2003-927

(51) Int. Cl.
*F02C 5/00* (2006.01)

(52) U.S. Cl. ......................................... 60/39.6; 60/645

(58) Field of Classification Search ................... 60/643, 60/645, 670, 39.6; 123/232, 238
See application file for complete search history.

(56) References Cited

U.S. PATENT DOCUMENTS

| | | | | |
|---|---|---|---|---|
| 3,043,283 | A * | 7/1962 | Vitale | 123/52.3 |
| 4,083,663 | A * | 4/1978 | Montalvo | 418/183 |
| 4,289,097 | A * | 9/1981 | Ward | 123/292 |
| 4,553,385 | A * | 11/1985 | Lamont | 60/39.6 |
| 6,543,411 | B2 * | 4/2003 | Raab et al. | 123/305 |
| 6,553,977 | B2 * | 4/2003 | Schmitz | 123/561 |
| 6,776,144 | B1 * | 8/2004 | Newman | 123/540 |
| 6,932,063 | B1 * | 8/2005 | Hu | 123/568.14 |

* cited by examiner

*Primary Examiner*—Hoang M Nguyen
(74) *Attorney, Agent, or Firm*—Blank Rome LLP

(57) ABSTRACT

The invention relates to a method for converting heat energy into mechanical energy by modifying the volume, pressure and temperature of a working medium, wherein the working medium in the first state (1) is suctioned and the volume of said first stage (1) is increased, whereupon it is converted into a second stage (2) when the volume of the first stage (1) is reduced and the volume of the second stage is increased, whereupon the working medium is converted into a fourth stage (4) via a third stage (3) wherein the volume of the second stage (2) is reduced, heat is also supplied and the volume of the fourth stage (4) is increased, whereupon the working medium is converted into a fifth stage (5) from the fourth stage (4) wherein the volume thereof is reduced and in the fifth stage (5) the volume of said fifth stage is expanded. The inventive method discloses a thermodynamic cycle process comprising five cycles. The invention also relates to a device for carrying out said method.

8 Claims, 1 Drawing Sheet

METHOD AND DEVICE FOR CONVERTING HEAT ENERGY INTO MECHANICAL ENERGY

FIELD OF INVENTION

The present invention relates to a process of the conversion of heat energy into mechanical energy by means of changing volume, pressure and temperature of the work medium, primarily gas in number of steps, and simultaneously relates to an apparatus for performing the process.

BACKGROUND TO THE INVENTION

There are known concepts of the conversion of heat energy into mechanical energy, where temperature and pressure is changed in the workspace with alternately changing volume. As the volume decreases, temperature and pressure increase both due to this volume change and primarily, in the last stage, due to the volume decreasing, or optionally, in the first stage due to the volume reincreasing, by the additional supply of heat energy either from the exterior, or from the heat generation (e.g. combustion) inside the workspace. As the volume reincreases, the pressure (originated from the previous workspace volume decreasing), after loss deduction, performs the work needed for consecutive volume decreasing. While the pressure, originated from the additional heat energy supply, after the loss deduction, performs the resulting mechanical work. At the permanently closed work space concept, the work medium temperature (due to the additional heat energy supply) would be, at the end of the operating cycle, greater than the temperature at the beginning of the previous volume increasing. So that, during an exterior heat supply, the medium temperature would reach the temperature, where the heat is supplied from the exterior and the temperature difference and also volume of the supplied heat would be, without a view to the losses, zero. The heat supply, developed in the medium, would stop due to the lack of oxygen, at the permanently closed workspace. It is therefore necessary to open the workspace for the used medium exhaust and the fresh medium supply for a certain time, namely both at the beginning of the volume decreasing, or before it and at the end of the volume increasing, or after it. The power cycle of the pressure and temperature variations, during the volume increasing and decreasing, proceeds in two stages. If there are other two stages added to the previous ones (i.e. volume increasing for the used medium supply and volume decreasing for the used medium exhaust) then there is the four-cycle process of the conversion of heat energy into mechanical energy implemented. If the medium supply and exhaust take place at the beginning of the first stage, or respectively at the end of the second stage, then the two-cycle process is implemented. All of these processes take place according to the known state of art in one workspace, exceptionally divided into two parts.

SUMMARY OF THE INVENTION

According to the present invention, work medium is sucked to the conversion of heat energy into mechanical energy by means of pressure and temperature change of the work medium into the first stage chamber simultaneously with the volume increasing of this stage chamber, whereby it transfers into the second stage chamber during the first stage chamber volume decreasing, whereby it transfers (during the second stage chamber volume decreasing) through the third stage chamber, simultaneously with the fourth stage chamber heat supply and simultaneously with this fourth stage chamber volume increasing, whereby it transfers from the fourth stage chamber (during its stage chamber volume decreasing) into the fifth stage chamber, where it is permitted to expand. The concept according to the present invention is described by the transfer of work medium through the third stage chamber simultaneously with the second stage chamber decreasing, simultaneously with warming, into the fifth stage chamber, or can be described by cooling during the transfer of the medium through the first stage chamber into the second one. Another aspect of the present invention is that the work medium is transferred, simultaneously with its cooling, from the fifth stage chamber into the first stage chamber simultaneously with this first stage chamber volume increasing. The concept can be, according to the present invention, modified so that the work medium is transferred from the fifth stage chamber, simultaneously with its volume decreasing, into the third stage chamber and is used for the warming process, or that the fifth stage chamber is joined with the first stage chamber and simultaneously with decreasing of the volume of this joined stage chamber is work medium (optionally with the simultaneous cooling) transferred directly into the second stage chamber, simultaneously with increasing the volumes of this second stage chamber. The apparatus for a multistage chamber conversion of heat energy into mechanical energy by means of changing volume, pressure and temperature of the work medium has the third stage chamber in form of a workspace with an invariable volume, while the other stage chambers are arranged as workspaces with variable volume (particularly as piston machines with the revolving piston) and are functionally, in a way of the work medium transfer, arranged one behind the other, partly before the third stage chamber and partly behind the third stage chamber. The apparatus for performing the present invention is further adapted in a way, so that the largest volume of the first stage chamber is larger then the largest volume of the second stage chamber, while the largest volume of the fifth stage chamber is larger than the largest volume of the fourth stage chamber, while the largest volume of the fifth stage chamber is larger than the largest volume of the first stage chamber or equal to the largest volume of the first stage chamber. The apparatus, according to the present invention, can be furthermore arranged, so that the fifth stage chamber concurrently forms the first one. According to another aspect of the present invention, the third stage chamber is created as a combustion chamber and/or a heat exchanger. The present invention is furthermore expediently adapted so that the fifth stage chamber is equipped by the inlet valve. According to this aspect of the present invention, the cooler is inserted between the first stage chamber and the second stage chamber, and also between the fifth stage chamber and the first stage chamber and also between the joined stage chamber and the second stage chamber.

BRIEF DESCRIPTION OF THE DRAWINGS

The present invention is readily understood from the Drawings, in which.

DETAILED DESCRIPTION

Figure 1:
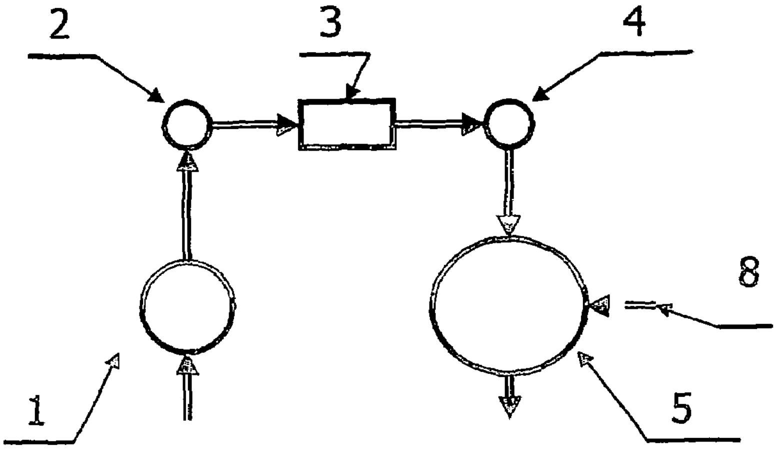
FIG. 1 shows an apparatus of the present invention.

Work medium is brought into the first stage chamber 1 during the first stage chamber volume increasing, as in FIG. 1, whereby it is, during the first stage chamber 1 volume decreasing, it is transferred into the stage chamber 2, simultaneously with its volume increasing. It is then, during the second stage chamber 2 volume decreasing, transferred into the third stage chamber 3. While transferring through the third stage chamber 3, heat is supplied into work medium either from inside, by combustion of the fuel in the working medium, or from outside by the third stage chamber heating e.g. by exterior combustion. Work medium is transferred from the third stage chamber 3 into the fourth stage chamber 4, whose volume simultaneously increases, whereon it is, from the fourth stage chamber 4, concurrently with its volume decreasing, transferred into the fifth stage chamber 5. In this fifth stage chamber 5, the work medium is allowed to expand within its volume increasing. Work medium is after its expansion, concurrently with the fifth stage chamber 5 volume decreasing, either conducted outside, or inside back into the first stage chamber 1. When using air as a work medium and exterior combustion as a process of the heat supply into the third stage chamber, it is convenient to use expanded, but hot, air for the outside combustion. The present invention therefore presents five-cycle thermo dynamical cycle. It can be convenient, in some cases, to avoid the fourth stage chamber 4 and to transfer work medium directly into the fifth stage chamber and allow it to expand in this stage chamber. It is convenient, when work medium is cooled inside the interstage cooler 6, during its transfer from the first stage chamber 1 into the second stage chamber 2 (see Picture 2). In the closed cycle, where the work medium is transferred from the fifth stage chamber 5 back into the first stage chamber 1, it is convenient to insert other interstage cooler 7 between the fifth and the first stage chamber. It is also convenient, in some cases, according to the other invention concept, to join the fifth and the first stage chamber into a joined stage chamber 51 and to transfer (during this joined stage chamber volume re-decreasing) work medium, expanded during the joined stage chamber 51 volume increasing, into the second stage chamber 2, simultaneously with this second stage chamber increasing, optionally through the joined interstage cooler 76. The basic five-stroke cycle is, in this case, adapted into the three-stoke cycles.

Figure 2:
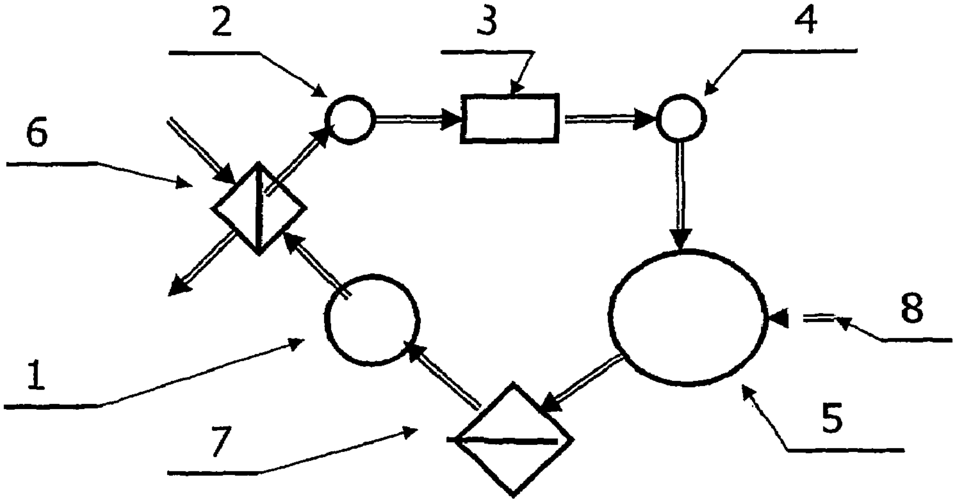
FIG. 2 shows a version with the cooler between the first stage chamber and the second stage chamber and also between the fifth stage chamber and the first stage chamber in accordance with the present invention.
Figure 3:
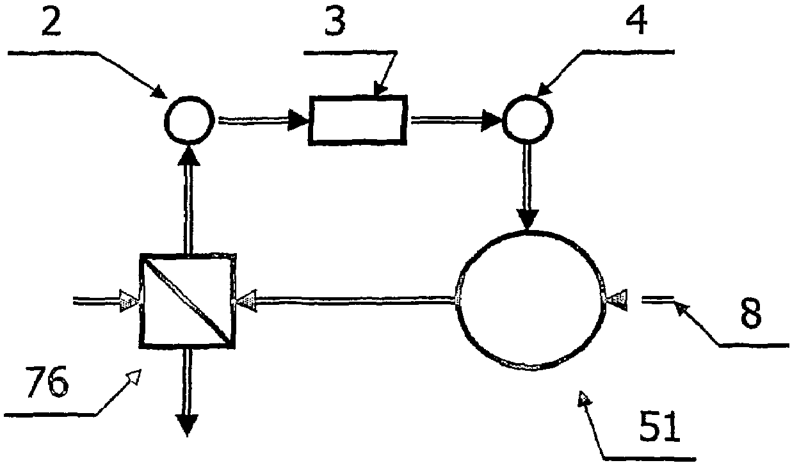
FIG. 3 shows a concept with the first stage chamber joined together with the fifth stage chamber and a concept with the cooler between the fifth stage chamber and the second stage chamber in accordance with the present invention.

The apparatus, as described above, performing the conversion of heat energy into mechanical energy is according to the invention, arranged in a way, so that the third stage chamber 3 is formed by, at least, one workspace with an invariable volume, while the other stage chambers 1, 2, 4, 5, 51 are created as workspaces with the variable volumes. It is convenient to create all the stage chambers, excluding the third one, as piston machines with the revolving piston. The volume of the space defined by each surface joining the cusps edges of the piston and by the adjacent inside surface of the cylinder increases and decreases in a cyclic process of rotation of the piston in the cylinder. Here, the largest volume of the first stage chamber 1 is larger than the largest volume of the second stage chamber 2, and furthermore, the largest volume of the fifth stage chamber 5 is larger or equal than the largest volume of the fourth stage chamber 4 and the largest volume of the stage chamber 5 is larger than the largest volume of the stage chamber 1. The largest volume of the joined stage chamber 51 is larger than the largest volume of the stage chamber 4 and also larger than the largest volume of the second stage chamber 2. The third stage chamber 3 is created as a combustion chamber and/or as a heat exchanger. Work medium is firstly supplied (e.g. by sucking) into the increasing volume of the first stage chamber 1. After reaching maximum, the volume of this stage chamber begins to decrease and work medium is exhausted into the increasing volume of the second stage chamber 2. Because the largest volume of the second stage chamber 2 is many times smaller than the largest volume of the first stage chamber 1, the state of work medium changes so that, after its shift from the first stage chamber 1 into the second stage chamber 2, this medium has higher pressure and also higher temperature. If an undue temperature increase is not desirable, it is possible to insert an interstage cooler 6 between both of the stage chambers according to the FIG. 2. When the volume again decreases in the second stage chamber 2, work medium is transferred from it through the third stage (chamber 3 into the fourth stage chamber 4, while increasing its volume. Heat is supplied into work medium in the third stage chamber 3 either by outside warming, where the stage chamber is made as a heat exchanger, or by inside combustion similarly as in the turbine's combustion chambers, but under considerably higher pressure. Because the largest volume of the fourth stage chamber 4 is generally equal to the largest volume of the second stage chamber 2, work medium has in the fourth stage chamber 4, after warming in the third stage chamber, in the final state, higher pressure and also higher temperature contrary to the initial state in the second stage chamber 2. Work medium expands from decreasing volume of the fourth stage chamber 4 into increasing volume of the fifth stage chamber 5, where it performs work. It is also possible to adapt this apparatus according to the present invention, so that the largest volume of the fourth stage chamber 4 is larger than the largest volume of the second stage chamber 2, so that the partial isobaric to isothermal expansion between both of the stage chambers will occur and the process according to the present invention will reach Carnot's cycle concept. In an extreme case, it is possible to completely avoid the fourth stage chamber and to let work medium expand from the second stage chamber 2, during warming in the third stage chamber 3, into the fifth stage chamber 5. The third stage chamber has a nonzero volume so that, if there is no heat supplied, the partial expansion occurs at the beginning of the work medium transfer and after transferring through the third stage chamber, work medium will have lower pressure and also lower temperature in the fourth stage chamber then in the second stage chamber. However, due to this lower pressure, the fourth stage chamber takes proportionally lower weighted quantity of work medium from the third stage chamber than it is supplied into the third stage chamber from the second stage chamber and the residual quantity generates, or optionally increases, the residual pressure in the third stage chamber. According to the size of the third stage chamber, in this manner also without heat supply, the pressure in the third stage chamber very quickly rises, so that expansion, within the work medium transfer from the second stage chamber through the third stage chamber, does not occur and it is possible to supply heat under the pressure given by compression of work medium from the first stage chamber into the second stage chamber. It is therefore possible to dimension the third stage chamber both as a combustion chamber with a small external area, so that needles heat leak does not occur, and as a heat exchanger with a large area, so that the largest heat quantity may be fed into it. In order to supply the largest possible heat quantity in the third stage chamber and to decrease the work expended during the compression stage of the cycle, it is, if possible, needed to decrease temperature during the transfer from the first stage chamber into the second one. It is, according to the present invention, enabled by inserting the interstage cooler 6 between the first stage chamber 1 and the second stage chamber 2. At the closed cycle, where work medium is transferred from the fifth stage chamber 5 back into the first stage chamber 1, it is appropriate to insert an innerstage cooler 7 between these two stage chambers. At the configuration according to the invention, it is possible to choose, independently upon the compression ratio, magnitude of the expansion ratio, so that it is possible to let expand the compressed and heated work medium to the pressure of the surrounding environment, whereby a good cycle efficiency is reached. At the given expansion ratio, the pressure at the end of the expansion is given by magnitude of the pressure at its beginning and this pressure, at the end of the expansion, can therefore, at the smaller heat supply, drop under the surrounding environment pressure. If this phenomenon is not desirable, it is possible to incorporate other inventive aspects i.e. additional work medium sucking through the inlet valve 8 at the end of the expansion. The power cycle, realized according to the present invention and apparatus, is therefore five-stroke cycles. At certain expansion ratio magnitude in the fifth stage chamber 5 (i.e. the ratio between the largest volumes of the fifth and fourth stage chambers), not only the pressure at the end of the expansion, but also the temperature drops to the value of the surrounding environment. It is therefore possible at the enclosed cycle and at the outside work medium warming, which take place in the third stage chamber 3, according to the other invention character, to join the fifth stage chamber 5 with the first stage chamber 1 according to FIG. 3 and to transfer work medium after expansion advantageously from the joined stage chamber 51 through the interstage cooler 76 into the second stage chamber 2 concurrently with its compression. In this case, it is also desirable to equip the joined stage chamber 51 by the inlet valve 8. It is therefore possible, in some cases, within the invention, to adapt the five-stroke cycle to the three-stroke cycle.

The present invention is, both according to the design examples mentioned previously and in comparison to the other known heat engines, more convenient especially by its possibility to allow higher working pressure and temperature then turbine engines, longer warming time of the compressed work medium and lower pressure and temperature at the end of the expansion then so far know piston engines. Higher cycle efficiency, lower emissions of the carbon and nitrogen oxides, lower noise in the case of work medium warming by external or internal combustion is the outcome of the present invention. It is also possible to use the present invention for the conversion of solar energy into mechanical energy.

The invention claimed is:

1. A process of a conversion of heat energy into mechanical energy by means of periodical changing volume, pressure and temperature of a work medium, in separate chambers of a heat engine, comprising the steps of:

sucking the work medium into a first stage chamber by enlarging the volume of the first stage chamber by motion of a piston of the first stage chamber;

transferring the work medium from the first stage chamber into a second stage chamber, concurrently with decreasing the volume of the first stage chamber by motion of the piston of the first stage chamber and increasing the volume of the second stage chamber by motion of a piston of the second stage chamber;

transferring the work medium from the second stage chamber through a third stage chamber of a constant volume to a fourth stage chamber concurrently with decreasing the volume of the second stage chamber by motion of the piston of the second stage chamber and increasing the volume of the fourth stage chamber by motion of a piston of the fourth stage chamber; while supplying heat to the work medium passing through the third stage chamber;

transferring the work medium from the fourth stage chamber to a fifth stage chamber, concurrently with decreasing the volume of the fourth stage chamber by motion of the piston of the fourth stage chamber and increasing the volume of the fifth stage chamber by motion of a piston of the fifth stage chamber; and discharging the work medium from the fifth stage chamber by decreasing the volume of the fifth stage chamber by motion of the piston of the fifth stage chamber;

wherein mechanical energy is consumed when decreasing the volume of the first stage chamber and decreasing the volume of the second stage chamber, and mechanical energy is carried away when increasing the volume of the fourth stage chamber and increasing the volume of the fifth stage chamber.

2. A process according to claim 1, further comprising the step of:

cooling the work medium during transfer from the first stage chamber into the second stage chamber.

3. A process according to claim 1, further comprising the step of:

transferring the work medium from the fifth stage chamber to the first stage chamber while cooling the work medium and concurrently decreasing the volume of the fifth stage chamber and increasing the volume of the first stage chamber.

4. A process according to claim 1, further comprising the step of:

transferring the work medium from the fifth stage chamber by decreasing the volume of the fifth stage chamber by motion of the piston of the fifth stage chamber to a heat exchanger for transmission of the heat energy to the work medium passing through the third stage chamber.

5. An apparatus for conversion of heat energy into mechanical energy by means of periodical changing volume, pressure and temperature of a work medium in separate chambers of a heat engine with moving pistons, comprising:

a first stage chamber having a variable volume and a second stage chamber having a variable volume, the largest volume of the first stage chamber being larger than the largest volume of the second stage chamber, a third stage chamber having a constant volume, provided with a means for heat supply for the work medium passing through the third stage chamber, and a fourth stage chamber having a variable volume and a fifth stage chamber having a variable volume, the largest volume of the fifth stage chamber being larger than the largest volume of the fourth stage chamber, and the largest volume of the fifth stage chamber being larger or equal to the largest volume of the first stage chamber.

6. An apparatus according to claim 5, wherein the fifth stage chamber is provided with an intake valve.

7. An apparatus according to claim 5, wherein a work medium inter stage cooler is placed between the first stage chamber and the second stage chamber.

8. An apparatus according to claim 5, wherein the third stage chamber is a combustion chamber with interior combustion or a heat exchanger with external heating.

* * * * *